United States Patent [19]

Aviram et al.

[11] Patent Number: 4,609,926

[45] Date of Patent: Sep. 2, 1986

[54] RIBBON TRANSFER COLOR-ON-DEMAND RESISTIVE RIBBON PRINTING

[75] Inventors: Ari Aviram, Croton-On-Hudson; Derek B. Dove, Mount Kisco, both of N.Y.

[73] Assignee: International Business Machines Corporation, Armonk, N.Y.

[21] Appl. No.: 728,713

[22] Filed: Apr. 30, 1985

[51] Int. Cl.[4] .............................................. G01D 15/10

[52] U.S. Cl. ................................ 346/76 PH; 346/105; 400/120; 400/202

[58] Field of Search ................ 346/76 PH, 76 R, 105, 346/134, 135.1, 136; 250/316-319; 400/120, 124, 202, 237, 241.4; 101/DIG. 7

[56] References Cited

U.S. PATENT DOCUMENTS 4,123,309 10/1978 Perrington et al. ............ 346/76 PH 4,400,100 8/1983 Aviram et al. .................... 346/76 R

*Primary Examiner*—Art Evans

*Attorney, Agent, or Firm*—Jackson E. Stanland

[57] ABSTRACT

An improved technique and apparatus for color-on-demand resistive ribbon printing is provided in which selected colored ink layers are transferred to a resistive printing ribbon from a color-bearing ribbon, prior to resistive ribbon printing. The color ribbon and the resistive printing ribbon both contain ink layers, the only difference being that the ink layer in the printing ribbon is preferrably uncolored. When the ink layers on the two ribbons are brought into contact with one another and heated, the ink layers will become tacky and will adhere to one another. The temperatures of these ink layers are then reduced and the printing ribbon and the color ribbon are separated from one another to cause the colored ink layer on the color ribbon to separate from that ribbon and adhere to the printing ribbon, thus causing a transfer of the colored ink layer to the printing ribbon. After this, the resistive printing ribbon can be used to print colors.

9 Claims, 5 Drawing Figures

RIBBON TRANSFER COLOR-ON-DEMAND RESISTIVE RIBBON PRINTING

DESCRIPTION

1. Field of the Invention

This invention relates to a technique for color-on-demand printing in a resistive ribbon thermal transfer printing system, and more particularly to a dry ribbon-to-ribbon color transferring technique wherein a selected color is transferred from a color ribbon to a printing ribbon just prior to the printing operation.

2. Background Art

Thermal transfer printing is one type of non-impact printing which is becoming increasingly popular as a technique for producing high quality printed materials. Applications for this type of printing exist in providing low volume printing such as that used in computer terminals and typewriters. In this type of printing, ink is printed onto the face of a receiving material (such as paper) whenever a fusible ink layer is brought into contact with the receiving surface, and softened by a source of thermal energy. The thermal energy causes the ink to locally melt and transfer to the receiving surface. Depending upon the pattern of heat applied to the ink layer, a character, such as a letter or a number, is transferred to the receiving material.

In one type of thermal transfer printing, termed resistive ribbon thermal transfer printing, the printing ribbon includes a layer of resistive material which is brought into contact with an electrical power supply and selectively contacted by a thin printing stylus at those locations opposite the receiving surface that are desired to be printed. Generally, a thin conductive layer is provided for a current return to a large contact electrode, often called a ground electrode. This ribbon also includes a layer of fusible ink and optionally includes an ink release layer located between the thin conductive layer and the ink layer. The purpose of the ink release layer is to facilitate the release of ink from the ribbon to the receiving surface, so that ink can be released at a lower temperature. In turn, this reduces the power requirements of the drivers used to provide electrical pulses to the printing styli. This also minimizes the production of organic debris and therefore insures longer styli life.

When electrical current is applied to the recording styli, the current travels through the resistive layer and provides local heating in order to melt a small volume of the fusible ink layer. The melted ink then transfers to the paper, etc. This type of printing is exemplified by U.S. Pat. No. 3,744,611. An electrothermal printhead for use in combination with a resistive ribbon is shown in IBM Technical Disclosure Bulletin, Vol. 23, No. 9, February 1981, at page 4305. A technique for reinking a resistive ribbon which has been used for an earlier printing operation is described in U.S. Pat. No. 4,253,775, in the names of Crooks and Pennington.

As noted, the resistive ribbon can take many forms, some of which include optional layers. For example, some resistive ribbons include a support layer, a layer of fusible ink, and a layer of electrically resistive material. The ink release layer is optional. In a variation, the resistive layer is thick enough to be the support layer, so that a separate support layer is not needed. The thin electrically conductive layer mentioned above is also optionally provided to serve as a current return. The compositions of these various layers are well known in the art. Various techniques for color printing are known in the prior art. These techniques generally use a ribbon having multiple colors thereon, or a plurality of different colored ink rollers. An example of multi-color printing using a resistive ribbon is described by A. D. Edgar et al, IBM Technical Disclosure Bulletin, Vol. 23, No. 7A, page 2633, December 1980. The fusible ink layer 5 of this reference uses one or more temperature-sensitive inks and a printing temperature control in order to select the temperature to which the ink layer is heated. Depending upon the temperature, one or two colors are printed. This is a type of color-on-demand system which is somewhat restricted because it requires more extensive electrical circuitry and a more complex thermal head.

Another type of ribbon color printing system is that represented by IBM Product 3287, sold by the International Business Machines Corporation. This is a color accent matrix printer which uses a multi-strike ribbon that has four regions of different colors. When the color of the printing has to be changed, the position of the ribbon is changed to bring the appropriate color portion of the ribbon beneath the printing head. This technique is economical when the ribbon is of the multi-strike type, but the colored portions of the ribbon can be under-utilized due to the fact that when the black portion of the ribbon is used up, the entire ribbon has to be discarded. An alternative technique that would index each color separately is not economically feasible because of the need and cost of four separate ribbon drives.

Another type of thermal print system using a thermal transfer ribbon having a repeating series of segments of the three basic colors, yellow, magenta, cyan, as well as black, is disclosed in U.S. Pat. No. 4,250,511. In that ribbon, the stripes are disposed perpendicularly to the ribbon's direction of transport, and they span the whole length of the print line, i.e., the whole print media width. A heat-applying printhead is formed by a series of elements arranged in a row transverse to the print area and ribbon transport direction. A color is selected by choice of heat cells in the printhead.

In the prior art using ribbons for thermal transfer printing, most colored printing is provided by a prearranged ribbon having the ink colorants already in the ribbon. The use of this ribbon is often uneconomical, especially when only a single color is utilized for extensive periods of time. The cost of the ribbon becomes excessive when resistive ribbon thermal printing is to be used.

In order to provide an economical color-on-demand feature in a resistive ribbon printing apparatus, a technique is described in copending patent application now U.S. Pat. No. 4,577,983, in the names of Aviram, Dove and Lane. In the scheme of this copending application, color is transferred to the resistive ribbon just prior to printing, where the color to be transferred is selected in accordance with the printing that is to be subsequently done with that ribbon. The resistive ribbon has an ink layer on it which is uncolored, and a colorant is transferred to the ink using, for example, a wick which is saturated with the desired color. By contacting the moving resistive ribbon and the wick, the colorant in the wick is transferred to the ink layer on the resistive ribbon.

While the technique in aforementioned copending application, Ser. No. 626,162, does provide color-on-demand printing, it involves a rather complicated apparatus and is typically a wet process. Such wet processes are disadvantageous in terms of the chemicals and solvents which must be used, as well as the difficulty in dealing with solutions which must be preferred. In particular, dry processes are generally preferred for commercial applications.

In order to overcome these disadvantages, the present technique uses ribbon-to-ribbon transfer in order to effect dry color-on-demand resistive ribbon printing. This operation is based on the fact that the fusible ink layer of a resistive printing ribbon becomes tacky at a temperature less than the melting temperature of the ink and, when in that tacky state, can be used to attract and hold another ink layer brought into contact with it. The other ink layer is a colored ink layer located on another ribbon (termed the "color ribbon"), which is brought into contact with the ink layer on the resistive ribbon printing. The ink layer on the resistive ribbon generally does not include a pigment, but includes other components of the ink formulation. That is, it is a suitable binder (resin) having no pigment therein. After the two ribbons are brought into contact for adherence of the colored ink layer to the resistive printing ribbon, the two ribbons are separated in such a manner that at least a portion of the colored ink layer separates from the color ribbon and adheres to the resistive printing ribbon.

U.S. Pat. No. 4,384,797 (C. W. Anderson et al), assigned to the present assignee, describes a lift-off correction technique for correction of printed material using a resistive ribbon. In that patent, ink which has already been printed onto a paper can be lifted off the paper by contacting it with the resistive ribbon, and applying heat to the ribbon. The printed ink becomes tacky and can be lifted-off the paper when the resistive ribbon is moved away from the paper.

In the present invention, some of the principles of aforementioned U.S. Pat. No. 4,384,797 are utilized to provide color-on-demand printing. However, in the course of applicants' experiments, it has been discovered that there are several changes which have to be made in order to effect proper color transfer, including the temperatures at which colored ink adherence is made, and the temperatures at which the color ribbon and the printing ribbon are separated. Since the printing ribbon has to be used for a subsequent high quality printing operation, there are other criticalities in terms of the thickness and compositional uniformity of the transferred colored ink layer. These considerations are not necessary or apparent in the aforementioned lift-off correction scheme where the portion of the resistive ribbon used for correction is not used for a subsequent printing operation.

Accordingly, it is a primary object of the present invention to provide an improved technique for color-on-demand resistive ribbon printing.

It is another object of the present invention to provide a dry process for color-on-demand printing in resistive ribbon printing systems.

It is another object of the present invention to provide an improved technique for color-on-demand printing using resistive ribbons, wherein color is imparted to a resistive printing ribbon in a dry process that is easily adaptable to commercial applications.

It is another object of the present invention to provide a simplified technique for color-on-demand resistive ribbon printing wherein colors are easily and successfully transferred to a resistive printing ribbon.

It is another object of the present invention to provide an improved technique for color-on-demand resistive printing wherein any desired color can be imparted to the resistive ribbon.

It is another object of the present invention to provide improved color-on-demand printing in a resistive ribbon printing system, wherein ribbon-ribbon transfer is used to provide the required color.

It is a further object of the present invention to provide a resistive ribbon printing system wherein colors can be printed on demand without impairing the quality of the printed material.

It is a still further object of the present invention to provide a color-on-demand resistive ribbon printing technique which is convenient and easy to implement in a commercial printing environment, and which is economical.

SUMMARY OF THE INVENTION

This invention relates to a color printing method and apparatus for resistive ribbon thermal printing, and in particular to an improved color-on-demand printing technique. Ribbon-to-ribbon transfer is used to selectively provide a colored ink layer on the resistive printing ribbon prior to its use in a printing operation. Transfer of at least a portion of the colored ink layer from a first ribbon (color ribbon), to a second ribbon (termed the resistive printing ribbon) is effected by bringing the two ribbons together so that the ink (i.e., resin) layers thereon are in contact with one another and applying a limited amount of heat to make at least one of the contacting resin layers tacky. When the two ribbons are separated from one another, at least a portion of the colored resin layer will adhere to the printing ribbon and be separated from the color ribbon.

In more detail, a colorless resin layer is provided on the resistive printing ribbon, while a colored resin (ink) layer is provided on the color ribbon. While it is not required for the successful operation of this invention, the resin layer on the resistive printing ribbon generally has the same components as the colored ink layer on the color ribbon, except that it contains no pigment. Therefore, it is termed a "resin" layer, which can be colored with a pigment making it an "ink" layer) or left uncolored. Since the resin layer on the color ribbon always contains a pigment, it is termed a "colored resin layer," or an "ink" layer.

When the two resin layers are brought into contact with one another by moving together the color ribbon and the print ribbon, application of a certain amount of heat will cause at least one of the uncolored resin layer on the printing ribbon and the colored resin layer on the color ribbon to become tacky and adhere to one another. The ribbons are designed so that the release of the colored ink layer from the color ribbon is easier than the release of the uncolored resin layer from the printing ribbon. Consequently, the colored ink layer will separate, or transfer, from the color ribbon to the printing ribbon when the ribbons are separated. After this, usual resistive ribbon printing techniques are followed, using the resistive printing ribbon which now has a colored ink layer, in addition to its uncolored resin layer.

The resistive printing ribbon can be any of the well known types of printing ribbons, such as those which utilize a resistive layer, a thin metal current return layer, an resin release layer (optional) and an ink layer which contains the usual resin components, but no pigment. Of course, some pigment can be in the ink layer on the resistive ribbon if a mix of colors is desired.

The color ribbon is generally comprised of only two layers, one of which is a support layer, and the other of which is the colored ink layer. The colored ink layer preferrably has the same resin components as the uncolored ink layer on the resistive printing ribbon, and in addition includes the color-forming pigment. The support layer of the color ribbon is chosen to be a material providing a very easy release of the colored ink layer, so that the colored ink layer will transfer to the resistive printing ribbon when the printing ribbon and the color ribbon are separated. Typical support layers for the color ribbon include polypropalene, polyethylene, thin paper and Mylar™ (a trademark of DuPont Company). The support layer for the color ribbon is generally chosen to be a material having a very low surface energy, so that the colored ink layer will easily be released therefrom. Good release from the color ribbon will also be obtained when the ink contains waxes (such as carnuba wax, parafin wax, etc.). Such formulations will release well from polyester and Mylar.

For commercial printing applications, it is desired to print at low current levels (less than about 35 mA.) Accordingly, the total thickness of the uncolored resin layer and the colored ink layer should be less than about 9 micrometers for printing currents in this range. However, the principles of this invention will be maintained even if larger printing currents are used.

It has been found that a wide range of temperatures exists over which the colored ink layer can be made tacky for adherence to the resistive printing ribbon. It has also been discovered that the resistive print ribbon and the color ribbon best separate from one another at relatively cool temperatures, less than about 40° C.

Any number of color ribbons can be used to impart selected colors to the resistive printing ribbon, and bars of colors or selected color patterns can be transferred. Images as well as characters can be transferred to the resistive printing ribbon.

These and other objects, features, and advantages will be apparent from the following more particular description of the preferred embodiments.

BEST MODE FOR CARRYING OUT THE INVENTION

Figure 1:
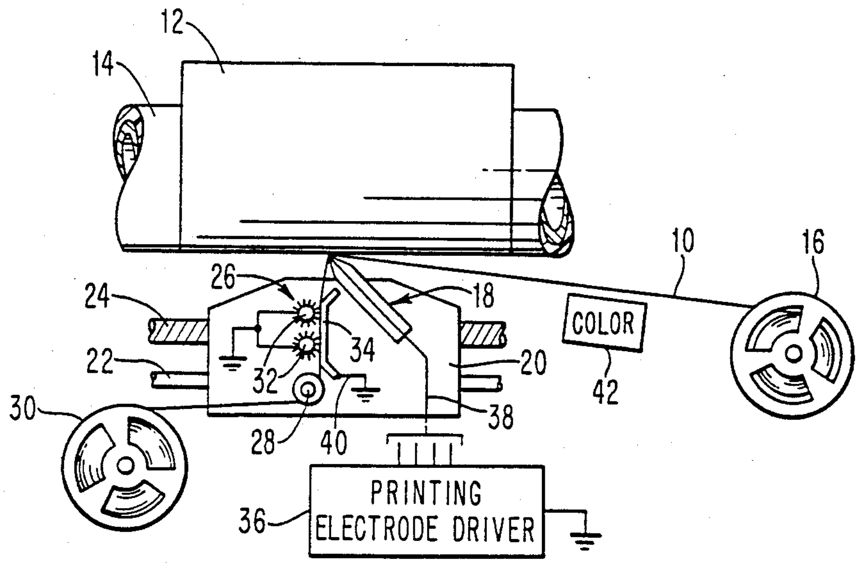
FIG. 1 (PRIOR ART)
FIG. 1 schematically illustrates a conventional type of resistive ribbon apparatus including a color-on-demand mechanism in accordance with the present invention.

FIG. 1 shows a conventional type of printing apparatus using a resistive printing ribbon 10 for printing onto a receiving medium, such as paper 12, which is supported by platen 14. Ribbon 10 starts at a supply reel 16, moves in the direction of arrow 17, and wraps around a printhead 18 which is mounted on a carrier 20 that is exaggerated in size. Movement of carrier 20 to provide relative printing motion is guided by a rail 22 and controlled by a lead screw 24, as is known in the art.

Ribbon 10 is threaded past a current collection means 26 and is wrapped around a guide roller 28. From the guide roller 28, the ribbon 10 is directed to the takeup reel 30. In this embodiment, current contacting means 26 is a pair of metal roller brushes 32 that are cylindrical in form, such as the type of brushes known for cleaning rifles. Pressure to assure good contact is applied by an opposing pressure pad 34. It should be noted that guide means such as guide roller 28 serves to wrap the ribbon 10 around the printhead 18 to permit convenient access to the surface of ribbon 10 defined by the ink layer of the ribbon which is in contact with the paper 12. This type of apparatus is described more particularly in aforementioned U.S. Pat. No. 4,329,071.

In operation, electrical printing currents are selectively supplied by printing electrode driver 36 via the signal channels 38 to the printhead 18. These currents enter the resistive layer of the ribbon 10 and tend to pass directly to the conducting layer of the ribbon. From the conducting layer of the ribbon, these currents are collected at least in part by the contacting means 26. To assure a current path for startup when no bare areas of the conducting layer of the ribbon may be present, some conducting material, such as carbon, may be provided in the ink layer of the ribbon or an alternate path may be provided using the pressure means 34 with a separate connection 40 to ground. With the connection 40, the current divides between the contacting means 26 and pressure means 34, providing an even lower impedance return path. It is also possible to provide a section at the beginning of the ribbon 10 that does not have the ink layer on it, so that access may be had to the conducting layer for startup.

While the ribbon 10 has been described in the preceding paragraphs as being a resistive ribbon used for resistive ribbon thermal transfer printing, it will be understood that the ribbon can have many different forms and can include optional layers, such as an ink release layer, a separate support layer, etc.. The particular type of resistive printing ribbon is not critical to the present invention.

In the printing apparatus of FIG. 1, a color-on-demand apparatus 42 is provided. This apparatus is the means by which a desired color is imparted to ribbon 10, just prior to the printing operation. Thus, coloring means 42 is located between the supply reel 16 and the printhead 18.

Figure 2:
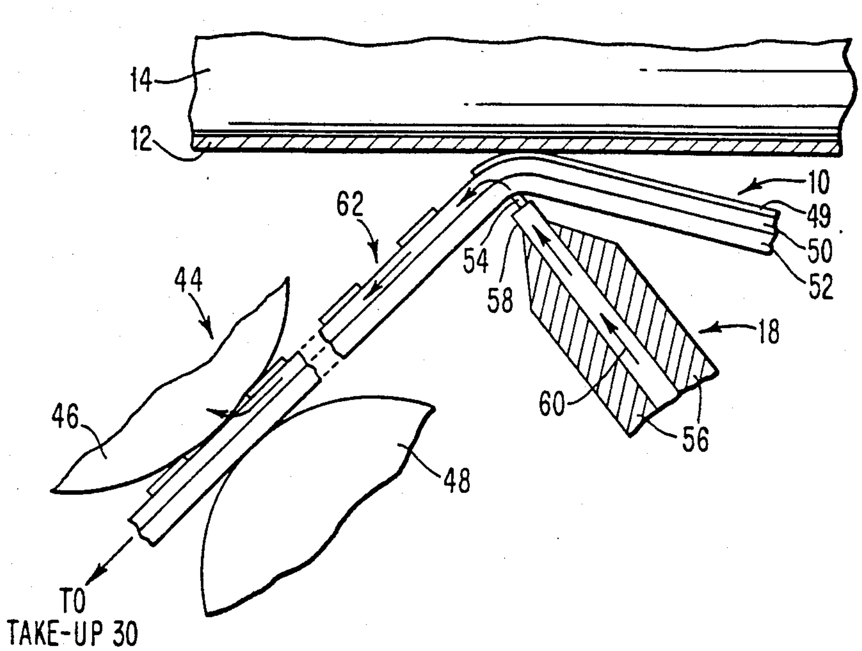
FIG. 2 is an expanded view of a portion of the apparatus of FIG. 1, and in particular illustrates the printing operation using a resistive ribbon 10 which has had a selected color imparted to it by the technique of the present invention.

FIG. 2 is an expanded view of a portion of the apparatus of FIG. 1, and in particular illustrates the printing operation. In FIG. 2, the current return path utilizes a contacting means 44 which is different than the contacting means 26 of FIG. 1. Contacting means 44 is comprised of a conductive roller 46 and a pressure roller 48. Contacting roller 46 can be comprised of an electrically conducting rubber that deforms under pressure from the opposing roller 48 in order to enter voids in the ink layer of the ribbon.

Ribbon 10 in FIG. 2 is shown as having three layers: an outer ink layer 49, a resistive layer 50 having a moderate resistance (e.g., 200–1200 ohms/sq., and an intermediate metal contacting layer 52. In a preferred embodiment, the ink layer 49 is actually comprised of three layers, as shown more closely in FIGS. 4 and 5. These layers are an ink release layer, an uncolored ink layer, and a colored ink layer which has been transferred to the resistive printing ribbon by the color means 42. The printhead 18 is comprised of a set of electrodes 54, where the printhead 18 includes clamping blocks 56 between which an insulating pad 58 and the set of electrodes 54 are pressed. The printing current flow is indicated by the arrows 60.

During printing the electrodes 54 swipe across the ribbon 10 which is pressed against the paper surface 12 supported by platen 14. Current enters the ribbon through resistive layer 52 and tends to flow directly to the conducting layer 50 which is greatly exaggerated in thickness in this figure. At least a portion of the current is collected for return by direct contact with the conductive layer 50 through the ink layer side of the ribbon 10. This direct contact enables the conducting roller 46 to enter voids 62 in the printing ribbon in order to establish electrical contact with the conductive layer 50. While it is not shown in FIG. 2, a return path connection from roller 46 to the current source (not shown) is also provided. In an alternative embodiment, a broad area contact (ground) electrode can be used for current return, where this ground electrode would be located on the same side of ribbon 10 as the printing electrode 54.

Figure 3:
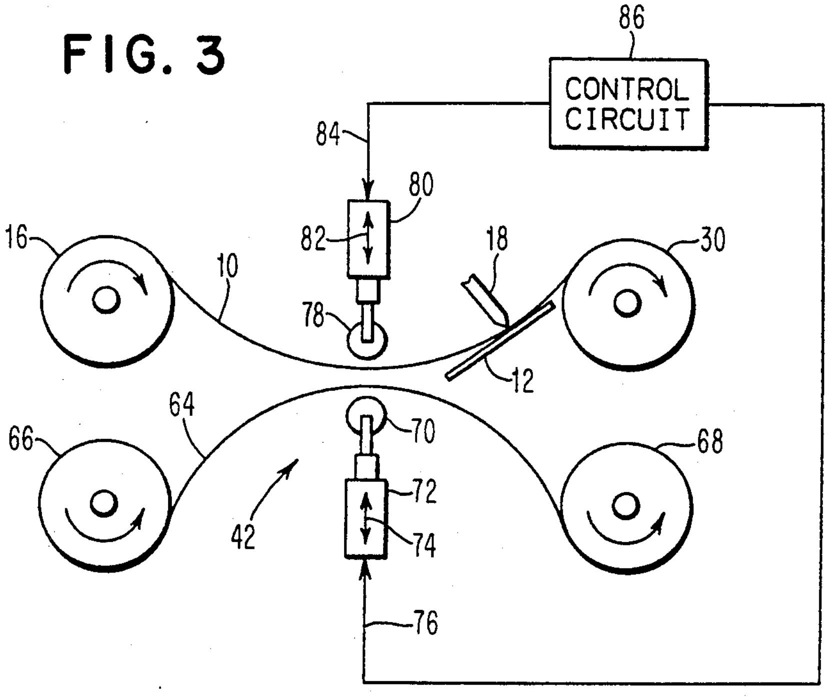
FIG. 3 schematically illustrates an apparatus for transferring a selected color to the resistive printing ribbon.

FIG. 3 represents one embodiment for the coloring means 42 which was schematically illustrated in FIG. 1. In order to relate FIG. 3 to the more complete apparatus of FIG. 1, the same reference numerals are used for the ribbon 10, paper 12, reels 16, 30 and printing head 18.

In more detail, color means 42 is comprised of a second ribbon 64 which moves from a supply reel 66 to a takeup reel 68. A hot roller 70 is connected to an actuator 72, and is moveable in the direction of arrows 74 in response to a control signal supplied on line 76. This brings hot roller 70 into and out of contact with the back (non-ink side) of color ribbon 64.

Figure 4:
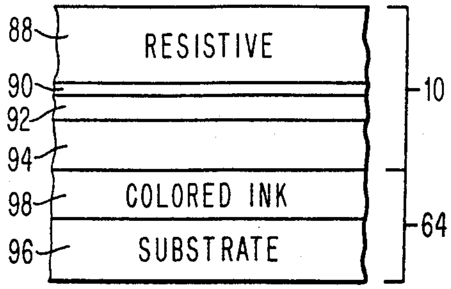
FIG. 4 illustrates the position of the resistive printing ribbon 10 and the color ribbon during the time when these ribbons are in contact with one another and heated to make the resin layers on each ribbon tacky in order to facilitate transfer of the colored ink layer to the resistive printing ribbon.
Figure 5:
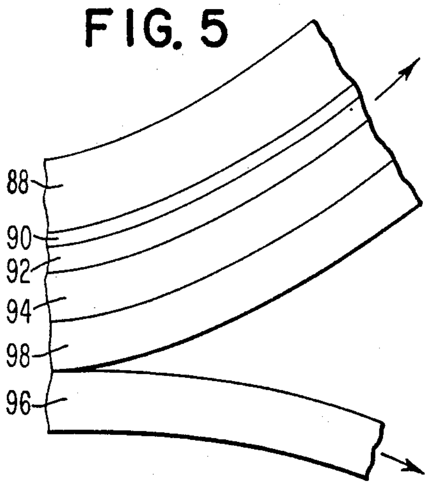
FIG. 5 schematically illustrates the peeling-apart, or separation, of the resistive printing ribbon and a color ribbon, showing in more detail the transfer of the colored ink layer from the colored ribbon to the resistive printing ribbon.

Located opposite the hot roller 70 is a roller 78, which could be a hot or cold roller. Roller 78 is connected to an actuator 80, and is moveable in the direction of arrows 82 in response to a control signal on line 84. A control circuit 86 is connected to lines 76 and 84 for controlling the motion of rollers 70 and 78. In order to transfer color from the color ribbon 64 to the resistive printing ribbon 10, ribbons 64 and 10 are brought together to contact the resin layers. When they contact one another, heat is applied to cause at least one of the resin layers to become tacky so that they will adhere to one another. When the ribbons 10 and 64 are later separated, at least a portion of the colored ink layer on ribbon 64 will transfer to ribbon 10. FIGS. 4 and 5 illustrate this operation.

In FIG. 4, the actuators 72 and 80 have brought rollers 70 and 78 into contact with the backs of ribbons 10 and 64, respectively, in order to press these ribbons together. While they are together, heat is applied to make at least one of the resin layers on the ribbons tacky. In FIG. 4, the resistive printing ribbon 10 is comprised of a resistive layer 88 which also acts as a support layer for the ribbon, a thin conductive current return layer 90, an resin release layer 92, and an uncolored ink layer 94. Layer 94 is comprised of a resinous base used for a fusible ink layer, but contains no pigment. Layer 94 could be comprised of a transparent polymer of a type well known in the art.

The color ribbon 64 is comprised of a substrate, or support layer 96, and a colored ink layer 98. Colored ink layer 98 includes a pigment and a resinous base. In a preferred embodiment, the same resin base is used in both layer 94 and layer 98.

FIG. 5 illustrates the separation of the resistive printing ribbon and the color ribbon, and the transfer of the colored ink layer 98 to the printing ribbon 10. The temperature at which the two ribbons are separated, and the materials comprising the ribbons, are chosen so that the colored ink layer will easily release from the color ribbon 64 in order to be transferred to the surface of the transparent resin layer 94. The entire thickness of the colored ink layer, or a portion of its thickness, can be transferred to provide on-demand coloring of the printing ribbon.

Generally, printing currents in the range of about 20–30 mA are used in commercial systems. In order to use printing currents in this range to provide good quality, high resolution resistive printing, the total thickness of the two resin layers 94 and 98 should not exceed approximately 9 micrometers. Thus, uncolored resin layer 94 is chosen to be approximately 5 micrometers in thickness, while colored ink layer 98 is chosen to be about 3 micrometers, $\pm 1$ micrometer. Generally, if transparent resin layer 94 is somewhat thicker than the colored ink layer 98, this will aid the transfer of the colored ink layer 98 from the color ribbon 64 to the printing ribbon 10 during separation of these ribbons, as depicted in FIG. 5.

The resin layers 94 and 98 are typically comprised of resinous bases of a type well known in the art. While it is preferrable that the resinous base be the same in both layers 94 and 98, this is not a necessity. However, when the resinous base is the same in both of the ink layers, the printing characteristic of the combined ink layers 94 and 98 will be uniform and each layer will exhibit the same printing characteristics. Further, mixing and transfer of the colored ink layer 98 to the printing ribbon will be enhanced.

The thermally transferrable resin layers 94 and 98 are usually comprised of a polymeric material which has a melting point of about 100° C. A color former is used in resin layer 98, but generally not in ink layer 94. An example of a suitable ink is one which contains polyamide. These inks are well known in the art (see, for example, Versamide 940, prepared by General Mills Co.).

As noted previously, the resin layers 94 and 98 are heated to a temperature less that which will cause melting of the resin, in order to make these layers tacky so that the colored ink layer can be transferred to the printing ribbon. In a printing system wherein printing currents of about 25 mA are used, a suitable current magnitude for transferring the colored ink layer is approximately 18 mA. In the practice of this invention, it has been found that the temperatures for the resin layers to become sufficiently tacky for transfer are about 68°–100° C., with a preferred temperature range being about 68°–85° C. At these temperatures, resin layers 94 and 98 will become sufficiently tacky that good transfer will occur.

The actual separation of the colored ink layer 98 from the color ribbon 64 occurs when the ribbons 10 and 64 are separated from one another, as shown in FIG. 5. In the course of applicants' experiments, it has been determined that a uniform transfer of the colored ink layer 98 to the printing ribbon occurs when the temperatures of these layers are relatively cold, i.e., in the range of temperatures less than about 40° C. Separation of the ribbons at room temperature provides very good results. This contrasts with the lift-off correction technique described in aforementioned U.S. Pat. No. 4,384,797, where temperatures in excess of 50° C. are preferred for lift-off of the ink which had been printed onto the paper.

The angle of separation between the printing ribbon and the color ribbon does not appear to be important in the successful transfer of the colored ink layer 98 to the printing ribbon. However, a relatively gradual angle of 30°-60° appears to be preferable and easy to achieve in a commercial printing system.

The amount of the colored layer transferred from the color ribbon to the printing ribbon is determined by the length of the color ribbon which is brought into contact with the printing ribbon and the width, length, etc. of the hot roller 70. In this regard, the speeds of transport of the printing ribbon and the color ribbon are also not critical, speeds of about 4-16 inches/sec having been found to be acceptable for good color transfer. After the desired amount of colored ink layer is transferred to the printing ribbon, control signals are applied to the actuators 72 and 82 to move the rollers 70 and 78, allowing the printing ribbon and the color ribbon to move out of contact with one another. Just prior to this, the heat delivered to hot roller 70 is reduced so that additional portions of the resin layers 94 and 98 will not become tacky. These resin layers will remain on their respective ribbons, and only the previously heated portions of the colored ink layer will be transferred to the printing ribbon.

While the heat applying mechanism has been shown to be a hot roller 70, it will be understood by those of skill in the art that the mechanism for applying heat can take any form, or structure. For example, the heat applying mechanism could be in the form of a plurality of printing electrodes of the type used in the printing head 18. In this manner, patterns or characters of colored ink can be delivered to the printing ribbon, and the same pattern can be reproduced onto the paper 12 by the same set of control signals being applied to the printing head 18. This feature also allows for the printing of all point addresses wherein images rather than characters can be directly printed by transfer of the appropriate image from the color ribbon to the printing ribbon. In this technique, dots of the colored ink layer will be transferred to the printing ribbon and subsequently printed onto the paper 12 if the colored dots are approximately the size of the printing electrodes. Further, the range of color transferred to the printing ribbon can be extended by juxtaposition of colored dots. This is achieved by using actual printing heads for the color transfer operation.

While only a single color transfer means 42 has been shown in FIG. 3, it will be understood by those of skill in the art that the color ribbon can contain a plurality of colors, or additional ribbons of other colors can be provided. Thus, any desired color can be transferred to the printing ribbon prior to its use for actual printing on the paper 12.

What has been described is an improved technique for color-on-demand printing using a fully dry process that requires no wet chemicals of any type. Ribbon-ribbon transfer of appropriate colors to the printing ribbon is achieved in accordance with the colors that will be desired for actual printing via computer operations and control, and in this way an economical use of the printing ribbon is achieved as well as very fast printing. The color ribbon is generally comprised of only two layers, and is itself easily and cheaply manufactured. It can, however, be a multilayer ribbon, and include an ink release layer. The technique has proven to be very successful in providing selected colors to the printing ribbon.

While the invention has been described with respect to selected embodiments thereof, it will be apparent to those of skill in the art that other embodiments and variations can be made therein without departing from the spirit and scope of the present invention. For example, the color ribbon could include a sticky colored ink layer, as manufactured, which is transferred to the printing ribbon by mechanical means, such as a pressure transfer. Also, some relative motion, or smearing, may occur between the ribbons without an adverse effect.

Having thus described our invention, what we claim as new and desire to secure by Letters Patent is:

1. A color-on-demand apparatus for resistive ribbon printing, comprising:

- a resistive printing ribbon comprised of an opaque resistive layer, through which electrical current passes to effect resistive ribbon printing and a layer of fusible resin which can be uncolored,
- a color ribbon including a substrate layer having a low surface energy and a layer of colored fusible resin thereon,
- means for bringing together said printing ribbon and said color ribbon to cause said fusible resin layers on each of said ribbons to contact one another at a selected location therealong,
- heat means for heating said layers of fusible resin when said layers are in contact at least to a temperature at which said resin layers become tacky, but less than the melting points of said resin layers,
- separation means for separating said resistive printing ribbon and said color ribbon to peel at least a portion of said colored resin layer from said color ribbon, said peeled colored resin layer adhering to said resistive ribbon when said ribbons are separated from one another, and
- means for effecting resistive ribbon printing using said resistive printing ribbon after said colored resin layer has been transferred to said resistive printing ribbon.

2. The apparatus of claim 1, wherein the total thickness of both of said resin layers is less than approximately 9 micrometers.

3. The apparatus of claim 2, wherein both of said resin layers have the same polymer base.

4. The apparatus of claim 1, wherein the adherence of said fusible resin layer to said resistive printing ribbon is greater than the adherence of said colored resin layer to said color ribbon when said ribbons are separated from one another.

5. The apparatus of claim 4 where each of said resin layers is comprised of a polymer.

6. The apparatus of claim 1, further including a printing head comprised of an array of printing electrodes which can be selectively energized to provide said electrical current to said resistive printing ribbon after said colored resin layer has been transferred to said resistive printing ribbon.

7. The apparatus of claim 1, wherein said resistive printing ribbon and said color ribbon are separated from one another at a separation temperature which is such that said colored resin layer will peel off said color ribbon and stick to said resistive printing ribbon.

8. The apparatus of claim 7, wherein said separation temperature is less than about 40° C.

9. The apparatus of claim 1, wherein said separation means separates said resistive printing ribbon and said color ribbon at a separation temperature less than about 40° C. and said heat means heats at least one of said fusible resin layers to a temperature between approximately 60° C. and 100° C.

* * * * *